(12) United States Patent
Yun et al.

(10) Patent No.: US 11,459,449 B2
(45) Date of Patent: Oct. 4, 2022

(54) THERMOSETTING RESIN COMPOSITION FOR COATING METAL THIN FILM AND METAL LAMINATE USING THE SAME

(71) Applicant: LG CHEM, LTD., Seoul (KR)

(72) Inventors: Minhyuk Yun, Daejeon (KR); Hyunsung Min, Daejeon (KR); Young Chan Kim, Daejeon (KR); Hee Yong Shim, Daejeon (KR); Changbo Shim, Daejeon (KR); Gilsang Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 440 days.

(21) Appl. No.: 16/606,108

(22) PCT Filed: Dec. 12, 2018

(86) PCT No.: PCT/KR2018/015776
§ 371 (c)(1),
(2) Date: Oct. 17, 2019

(87) PCT Pub. No.: WO2019/117624
PCT Pub. Date: Jun. 20, 2019

(65) Prior Publication Data
US 2020/0048440 A1  Feb. 13, 2020

(30) Foreign Application Priority Data

Dec. 14, 2017  (KR) .................. 10-2017-0172270
Dec. 7, 2018  (KR) .................. 10-2018-0157085

(51) Int. Cl.
| | |
|---|---|
| C08L 9/06 | (2006.01) |
| C08L 23/22 | (2006.01) |
| C08L 63/00 | (2006.01) |
| C08L 21/00 | (2006.01) |
| B05D 7/14 | (2006.01) |
| C08K 5/18 | (2006.01) |
| C08K 3/22 | (2006.01) |
| C08K 3/40 | (2006.01) |
| C08K 3/34 | (2006.01) |
| C08K 3/36 | (2006.01) |
| C08K 3/38 | (2006.01) |
| C08K 3/013 | (2018.01) |

(52) U.S. Cl.
CPC .................. *C08L 9/06* (2013.01); *B05D 7/14* (2013.01); *C08L 21/00* (2013.01); *C08L 23/22* (2013.01); *C08L 63/00* (2013.01); *C08K 3/013* (2018.01); *C08K 3/346* (2013.01); *C08K 3/36* (2013.01); *C08K 3/40* (2013.01); *C08K 5/18* (2013.01); *C08K 2003/2224* (2013.01); *C08K 2003/2227* (2013.01); *C08K 2003/2255* (2013.01); *C08K 2003/387* (2013.01)

(58) Field of Classification Search
CPC .. C08L 9/06; C08L 23/22; C08L 63/00; C08L 21/00; B05D 7/14
See application file for complete search history.

(56) References Cited

U.S. PATENT DOCUMENTS

| | | | |
|---|---|---|---|
| 5,627,222 | A | 5/1997 | Recker et al. |
| 2004/0068036 | A1 | 4/2004 | Halladay et al. |
| 2010/0084171 | A1 | 4/2010 | Fujihara et al. |
| 2010/0330780 | A1 | 12/2010 | Hwang et al. |
| 2014/0199549 | A1 | 7/2014 | Shin |
| 2017/0009074 | A1 | 1/2017 | Xi et al. |
| 2017/0022356 | A1 | 1/2017 | Yamazawa et al. |
| 2018/0148555 | A1* | 5/2018 | Moon .................. H01L 23/145 |

FOREIGN PATENT DOCUMENTS

| | | | |
|---|---|---|---|
| CN | 1703475 | A | 11/2005 |
| CN | 101578320 | A | 11/2009 |
| CN | 102558861 | A | 7/2012 |
| CN | 102838962 | A | 12/2012 |
| CN | 105585817 | A | 5/2016 |
| CN | 107353642 | A | 11/2017 |
| JP | 1-238930 | A | 9/1989 |
| JP | 2-225040 | A | 9/1990 |
| JP | 05-239317 | A | 9/1993 |
| JP | 08-073631 | A | 3/1996 |
| JP | 2011-053421 | A | 3/2011 |
| JP | 2014-24926 | A | 2/2014 |
| JP | 2014-28932 | A | 2/2014 |
| JP | 2014-111696 | A | 6/2014 |
| JP | 2014-232854 | A | 12/2014 |
| JP | 2016-065226 | A | 4/2016 |
| JP | 2018-518563 | A | 7/2018 |
| KR | 10-2009-0071774 | A | 7/2009 |
| KR | 10-2009-0076857 | A | 7/2009 |
| KR | 10-2009-0098563 | A | 9/2009 |
| KR | 10-2011-0039044 | A | 4/2011 |
| KR | 10-1582398 | B1 | 1/2016 |
| KR | 10-2016-0091887 | A | 8/2016 |
| KR | 10-2016-0126043 | A | 11/2016 |
| KR | 10-2017-0084991 | A | 7/2017 |
| WO | 2013/015469 | A1 | 1/2013 |
| WO | 2013/073606 | A1 | 5/2013 |

\* cited by examiner

*Primary Examiner* — Robert D Harlan
(74) *Attorney, Agent, or Firm* — Dentons US LLP

(57) ABSTRACT

The present invention relates to a thermosetting resin composition for coating a metal film having excellent crack resistance and a metal laminate using the same.

15 Claims, 2 Drawing Sheets

[FIG. 1]
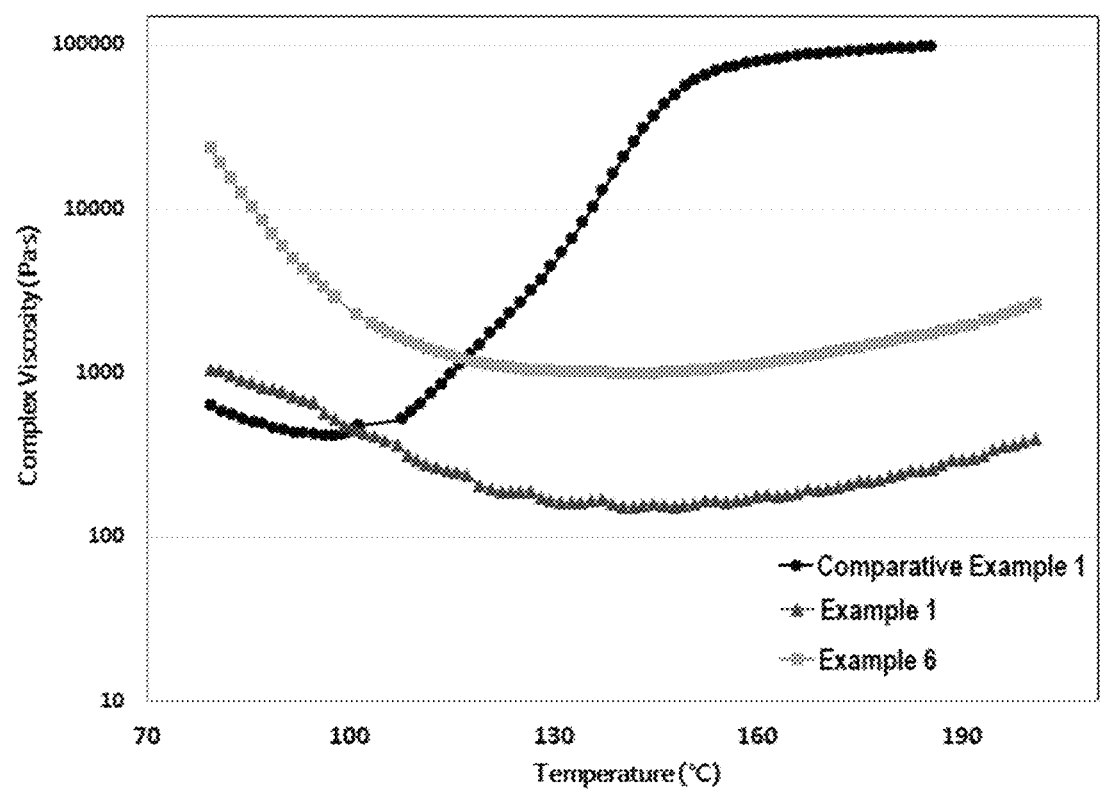

[FIG. 2]
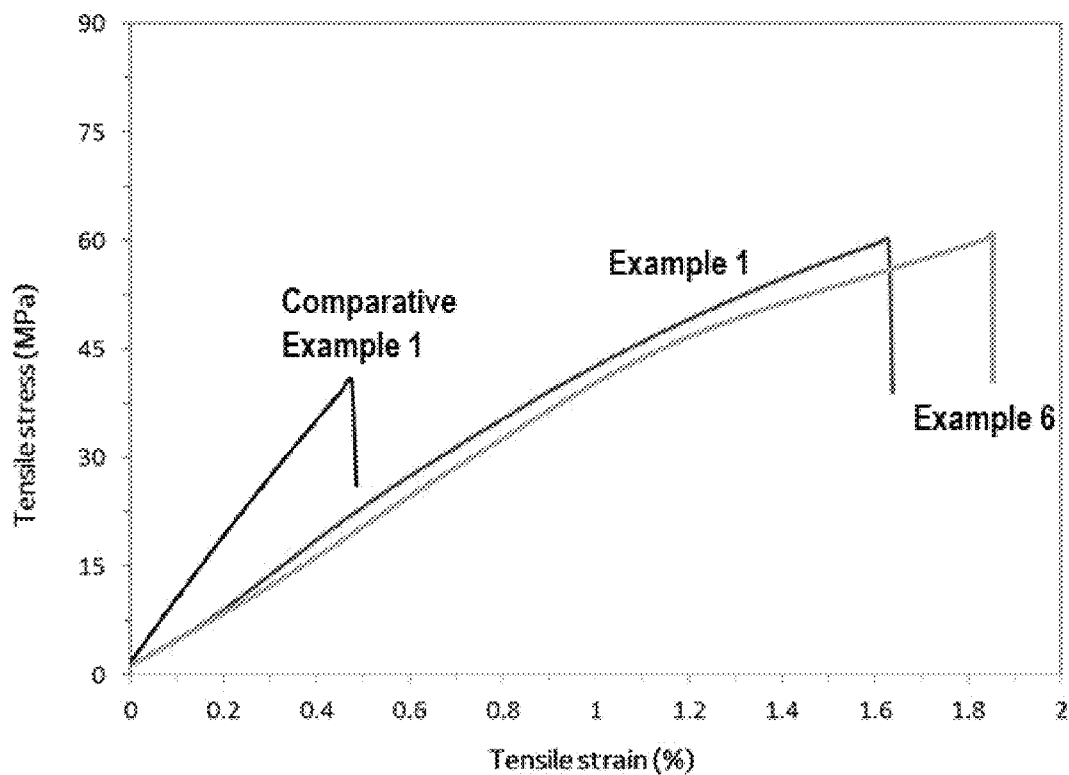

THERMOSETTING RESIN COMPOSITION FOR COATING METAL THIN FILM AND METAL LAMINATE USING THE SAME

The present application is a National Phase entry pursuant to 35 U.S.C. § 371 of PCT/KR2018/015776 filed on Dec. 12, 2018, and claims priority to and the benefit of Korean Patent Application No. 10-2017-0172270 filed with Korean Intellectual Property Office on Dec. 14, 2017, and Korean Patent Application No. 10-2018-0157085 filed with Korean Intellectual Property Office on Dec. 7, 2018, the entire contents of which are incorporated herein by reference.

FIELD

The present invention relates to a thermosetting resin composition for coating a metal thin film having excellent crack resistance, and a metal laminate using the same.

BACKGROUND

A copper clad laminate used for a conventional printed circuit board is produced by impregnating a glass fabric substrate with a varnish of the thermosetting resin and then semi-curing it to prepare a prepreg, which is then heated and pressed together with a copper foil. A circuit pattern is formed on such a copper clad laminate, and a prepreg is again used for building-up thereon.

Recently, achieving higher performance, weight reduction, and thickness reduction of electronic devices, communication devices, personal computers, smart phones, and the like has accelerated, semiconductor packages are also required to be reduced in size. At the same time, there is a growing need to reduce the thickness of printed circuit boards for semiconductor packages.

In other words, as the form factor of electronic devices has recently been reduced, the thickness of the semiconductor package becomes smaller and smaller. However, since a prepreg, which is a laminated material among conventional package components, includes a woven glass fabric, it is difficult to reduce the thickness by more than a certain amount.

On the other hand, since a resin-coated copper (RCC) foil as an alternative material for a prepreg does not contain glass fibers, its thickness can be made smaller than the prepreg.

However, since the resin-coated copper foil, which is thinner than conventional prepregs, does not contain glass fibers as a reinforcing substrate, cracks are likely to occur in the packaging process. When cracks occur in the process, this leads to a reduction in overall yield, and can also have an adverse effect on reliability. Therefore, it is necessary to improve the crack resistance of the resin layer in the resin-coated copper foil.

Moreover, among the properties of the laminated material, the most important feature is a property of filling a pattern (reclamation property). That is, since the resin-coated copper foil as a laminated material must be filled with a pattern, flowability of the resin is an important feature. In particular, as the thickness of the resin-coated copper foil laminate becomes smaller, the amount of resin is reduced, and it is difficult to fill the pattern. If the pattern is not properly filled, an empty void is generated, and reliability, performance, and the like of the semiconductor substrate are deteriorated. When the thickness of the resin-coated copper foil is reduced, the amount of the resin is also reduced. Thus, the pattern is not filled, and the probability of generating voids after lamination increases. In other words, if the thickness of the resin is reduced to make the substrate thinner, the pattern-filling property is deteriorated.

Therefore, in order to increase the pattern-filling property and prevent cracks while reducing the thickness, it is necessary to simultaneously increase the flowability and crack resistance of the resin.

A commonly used method to achieve this is to use a monomolecular resin. In the case of a resin having a low molecular weight, since the viscosity before curing is low within the lamination process temperature range, the flowability and the pattern-filling property are excellent. However, since monomolecular resins have surface stickiness before curing, a protective film is required. Also, as the curing reaction proceeds slowly during storage at room temperature, it has a disadvantage that it is vulnerable to changes over time. In addition, the resin has a problem that crack resistance is not sufficient and thus the overall yield decreases.

SUMMARY

An object of the present invention is intended to provide a thermosetting resin composition for coating a metal thin film which is excellent in flowability and pattern-filling property by widening a temperature range for maintaining a minimum viscosity, and that is capable of improving crack resistance of a metal thin film.

Another object of the present invention is to provide a metal laminate including a resin coating layer which is a cured product of the thermosetting resin composition having excellent mechanical properties, and a method for producing the same.

In order to achieve the above-mentioned objects, the present invention provides a thermosetting resin composition for coating a metal film, including:

an amine compound containing at least one functional group selected from the group consisting of a sulfone group, a carbonyl group, a halogen group, an alkyl group having 1 to 20 carbon atoms, an aryl group having 6 to 20 carbon atoms, a heteroaryl group having 2 to 30 carbon atoms, and an alkylene group having 1 to 20 carbon atoms; a binder resin containing an epoxy resin and a bismaleimide resin; an inorganic filler; and a rubber-based component, wherein the rubber-based component includes at least one selected from the group consisting of a styrene-butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber, the rubber-based component is contained in an amount of at least 5 parts by weight and less than 40 parts by weight, based on 100 parts by weight in total of the amine compound and the binder resin, and the thermosetting resin composition satisfies the condition of a complex viscosity of 3500 Pa·s or less in the range in which a rheometer lowest viscosity window is 90 to 180° C.

The present invention also provides a metal laminate including a resin coating layer in which a thermosetting resin composition is cured on at least one surface of a metal film, wherein the resin coating layer includes:

a cured product between an amine compound containing at least one functional group selected from the group consisting of a sulfone group, a carbonyl group, a halogen group, an alkyl group having 1 to 20 carbon atoms, an aryl group having 6 to 20 carbon atoms, a heteroaryl group having 2 to 30 carbon atoms, and an alkylene group having 1 to 20 carbon atoms, a binder resin containing an epoxy resin, and a bismaleimide resin, and at least one rubber-based component selected from the group consisting of a styrene-butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber; and a filler dispersed in the cured product.

In addition, the present invention provides a method for producing a metal laminate, including coating the aforementioned thermosetting resin composition onto at least one surface of the metal thin film.

Further, the present invention provides a metal foil clad laminate in which metal laminates are laminated into one or more layers.

BRIEF DESCRIPTION OF THE DRAWINGS

FIG. 1 shows rheometer curves for confirming the flowability and pattern-filling property of Examples 1 and 6 of the present invention and Comparative Example 1.

FIG. 2 is a graph showing a comparison of the elongation measurement results of Examples 1 and 6 of the present invention and Comparative Example 1.

DETAILED DESCRIPTION

Hereinafter, a thermosetting resin composition for coating a metal thin film, a resin-coated metal laminate, and a metal foil clad laminate using the same according to specific embodiments of the present invention will be described in more detail.

First, the metal laminate of the present invention can include a form in which the thermosetting resin composition is coated onto the metal thin film in a predetermined thickness.

The metal thin film is a substrate for coating a resin composition, and may be in the form of a thin film containing a single or composite metal component as described below.

Further, the metal foil clad laminate may include a structure in which the metal laminate layers are laminated into one or more layers.

According to one embodiment of the invention, a thermosetting resin composition for coating a metal thin film is provided, including: an amine compound containing at least one functional group selected from the group consisting of a sulfone group, a carbonyl group, a halogen group, an alkyl group having 1 to 20 carbon atoms, an aryl group having 6 to 20 carbon atoms, a heteroaryl group having 2 to 30 carbon atoms, and an alkylene group having 1 to 20 carbon atoms; a binder resin containing an epoxy resin and a bismaleimide resin; an inorganic filler; and a rubber-based component, wherein the rubber-based component includes at least one selected from the group consisting of a styrene-butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber, the rubber-based component is contained in an amount of at least 5 parts by weight and less than 40 parts by weight, based on 100 parts by weight in total of the amine compound and the binder resin, and the thermosetting resin composition satisfies the condition of a complex viscosity of 3500 Pa·s or less in the range in which the rheometer lowest viscosity window is 90 to 180° C.

The present invention relates to a thermosetting resin composition for coating a metal thin film having sufficient flowability and an excellent pattern-filling property, and having improved crack resistance.

Conventionally, a metal foil clad laminate has been mainly produced by using a prepreg obtained by impregnating a resin composition in a woven glass fabric. However, there is a limit in reducing the thickness, and there is also a problem that if the thickness decreases, the flowability of the resin is decreased during the lamination process of the copper foil, and thus the pattern-filling property is poor. In addition, although it is possible to reduce the thickness of the copper foil coated with the resin, if a monomolecular type of resin is used, there are many disadvantages in terms of storability and stability.

Further, conventional thermosetting resin compositions are disadvantageous in that they have a high modulus after curing and thus are easily broken, resulting in a decreased in crack resistance.

Accordingly, in the present invention, as a resin system composed of an epoxy and an amine curing agent, and a rubber-based component, are introduced in a small amount, not only is the flowability of the resin ensured, but also the crack resistance of the metal laminate in which the thermosetting resin composition is coated onto the metal thin film is improved. Further, the composition of the present invention is characterized by optimizing the type of resin and the mixing ratio.

According to the present invention, the curing reaction of the resin can be easily controlled by using a specific amine curing agent. More specifically, the modulus can be lowered by controlling the functional groups of the amine curing agent, and thus controlling the number of bonds formed during the curing reaction of the resin. This leads to an increase in crack resistance, and it becomes possible to have more stability against tensile force or impact.

In addition, the thermosetting resin composition for coating a metal thin film used in the present invention controls flowability by adding a specific rubber component to the composition while concurrently controlling the curing reaction. As a result, the rheometer lowest viscosity window is widened, which is advantageous for flowability and the pattern-filling property. Preferably, the present invention has the effect of improving the flowability of the resin by widening the window for maintaining the minimum viscosity within the temperature range of the metal foil laminating process.

For example, assuming that the complex viscosity suitable for filling the pattern is 3500 Pa·s or less, in the case of the resin composition proposed in the present invention, the temperature range satisfying the viscosity condition is 90 to 180° C., which is very wide. That is, the flowability in the laminating process section is high and the pattern-filling property is excellent, and thus the crack resistance of the metal thin film coated with the thermosetting resin composition can be improved. However, when the complex viscosity condition of the thermosetting resin composition becomes too high by exceeding the above range, the flowability is decreased and so the pattern-filling property may become poor. Further, even if the complex viscosity condition is satisfied, the conventional thermosetting resin composition may have a relatively narrow working temperature range.

Now, the components of the thermosetting resin composition for coating a metal thin film and the metal thin film and the metal laminate using the resin composition according to a preferred embodiment of the present invention will be described in more detail.

The present inventors found that when the thermosetting resin composition for coating a metal thin film of the above embodiment is used, the reactivity of the amine compound is reduced through the amine compound containing a strong electron withdrawing group (EWG) such as at least one functional group selected from the group consisting of a sulfone group, a carbonyl group, a halogen group, a substituted alkyl group having 1 to 20 carbon atoms, a substituted aryl group having 6 to 20 carbon atoms, a substituted heteroaryl group having 2 to 30 carbon atoms, and a substituted alkylene group having 1 to 20 carbon atoms, and thereby the curing reaction of the resin composition can be easily controlled.

Specifically, the thermosetting resin composition of this embodiment may include an amine compound containing at least one functional group selected from the group consisting of a sulfone group, a carbonyl group, a halogen group, an alkyl group having 1 to 20 carbon atoms, an aryl group having 6 to 20 carbon atoms, a heteroaryl group having 2 to 30 carbon atoms, and an alkylene group having 1 to 20 carbon atoms. The amine compound can be used as an amine curing agent.

In this case, the alkyl group having 1 to 20 carbon atoms, the aryl group having 6 to 20 carbon atoms, the heteroaryl group having 2 to 30 carbon atoms, and the alkylene group having 1 to 20 carbon atoms contained in the amine compound may each independently be substituted with at least one functional group selected from the group consisting of a nitro group, a cyano group, and a halogen group.

The at least one functional group selected from the group consisting of a sulfone group, a carbonyl group, a halogen group, a substituted alkyl group having 1 to 20 carbon atoms, a substituted aryl group having 6 to 20 carbon atoms, a substituted heteroaryl group having 2 to 30 carbon atoms, and a substituted alkylene group having 1 to 20 carbon atoms is a strong electron withdrawing group (EWG), and the amine compound containing the electron withdrawing group has decreased reactivity as compared with an amine compound not containing the electron withdrawing group, and the curing reaction of the resin composition can be easily controlled therefrom.

Therefore, the degree of curing reaction of the composition can be controlled by the amine compound, thereby improving the flowability and improving the circuit pattern-filling property.

Specifically, the amine compound may include at least one compound selected from the group consisting of the following Chemical Formulas 1 to 3.

[Chemical Formula 1]

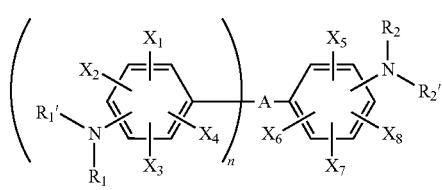

In Chemical Formula 1, A is a sulfone group, a carbonyl group, or an alkylene group having 1 to 10 carbon atoms, $X_1$ to $X_8$ are each independently a nitro group, a cyano group, a hydrogen atom, a halogen group, an alkyl group having 1 to 6 carbon atoms, an aryl group having 6 to 15 carbon atoms, or a heteroaryl group having 2 to 20 carbon atoms, $R_1$, $R_1'$, $R_2$, and $R_2'$ are each independently a hydrogen atom, a halogen group, an alkyl group having 1 to 6 carbon atoms, an aryl group having 6 to 15 carbon atoms, or a heteroaryl group having 2 to 20 carbon atoms, and n is an integer of 1 to 10, wherein the alkylene group having 1 to 10 carbon atoms, the alkyl group having 1 to 6 carbon atoms, the aryl group having 6 to 15 carbon atoms, or the heteroaryl group having 2 to 20 carbon atoms are each independently substituted with a nitro group, a cyano group, and a halogen group.

[Chemical Formula 2]

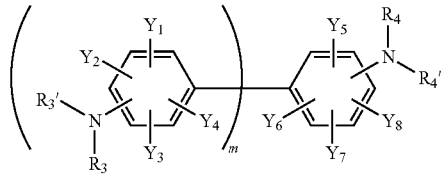

In Chemical Formula 2, $Y_1$ to $Y_8$ are each independently a nitro group, a cyano group, a hydrogen atom, a halogen group, an alkyl group having 1 to 6 carbon atoms, an aryl group having 6 to 15 carbon atoms, or a heteroaryl group having 2 to 20 carbon atoms, $R_3$, $R_3'$, $R_4$, and $R_4'$ are each independently a hydrogen atom, a halogen group, an alkyl group having 1 to 6 carbon atoms, an aryl group having 6 to 15 carbon atoms, or a heteroaryl group having 2 to 20 carbon atoms, and m is an integer of 1 to 10, wherein the alkyl group having 1 to 6 carbon atoms, the aryl group having 6 to 15 carbon atoms, and the heteroaryl group having 2 to 20 carbon atoms are each independently substituted with at least one functional group selected from the group consisting of a nitro group, a cyano group, and a halogen group.

[Chemical Formula 3]

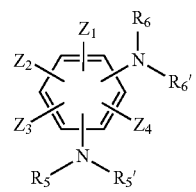

In Chemical Formula 3, $Z_1$ to $Z_4$ are each independently a nitro group, a cyano group, a hydrogen atom, a halogen group, an alkyl group having 1 to 6 carbon atoms, an aryl group having 6 to 15 carbon atoms, or a heteroaryl group having 2 to 20 carbon atoms, and $R_5$, $R_5'$, $R_6$, and $R_6'$ are each independently a hydrogen atom, a halogen group, an alkyl group having 1 to 6 carbon atoms, an aryl group having 6 to 15 carbon atoms, or a heteroaryl group having 2 to 20 carbon atoms, wherein the alkyl group having 1 to 6 carbon atoms, the aryl group having 6 to 15 carbon atoms, and the heteroaryl group having 2 to 20 carbon atoms are each independently substituted with at least one functional group selected from the group consisting of a nitro group, a cyano group, and a halogen group.

The alkyl group is a monovalent functional group derived from an alkane, and may be, for example, a linear, branched, or cyclic methyl, ethyl, propyl, isobutyl, sec-butyl, tert-butyl, pentyl, hexyl, and the like.

The alkylene group is a bivalent group derived from an alkane, and may be, for example, a linear, branched, or cyclic methylene group, ethylene group, propylene group, isobutylene group, sec-butylene group, tert-butylene group, pentylene group, hexylene group, and the like.

The at least one hydrogen atom contained in the alkylene group may each be substituted with the same substituent as in the alkyl group described above.

The aryl group is a monovalent functional group derived from an arene, and may be, for example, monocyclic or polycyclic.

Specific examples of the monocyclic aryl group may include a phenyl group, a biphenyl group, a terphenyl group, a stilbenyl group, and the like, but are not limited thereto.

Specific examples of the polycyclic aryl group may include a naphthyl group, an anthracenyl group, a phenanthryl group, a triphenyl group, a pyrenyl group, a phenalenyl group, a pyrenyl group, a perylenyl group, a chrysenyl group, a fluorenyl group, and the like, but are not limited thereto.

The at least one hydrogen atom contained in the aryl group may each be substituted with the same substituent as in the alkyl group described above.

The heterocyclic group is a cyclic group including O, N, or S as a heteroatom, and the number of carbon atoms is not particularly limited, but it may be 2 to 30.

Examples of the heterocyclic group include a thiophene group, a furan group, a pyrrole group, an imidazole group, a thiazole group, an oxazole group, an oxadiazole group, a triazole group, a pyridyl group, a bipyridyl group, a triazine group, an acrydyl group, a pyridazine group, a quinolinyl group, an isoquinoline group, an indole group, a carbazole group, a benzoxazole group, a benzoimidazole group, a benzothiazole group, a benzocarbazole group, a benzothiophene group, a dibenzothiophene group, a benzofuranyl group, a dibenzofurane group, and the like, but are not limited thereto.

The at least one hydrogen atom contained in the heteroaryl group may each be substituted with the same substituent as in the alkyl group described above.

The term "substituted" means that other functional groups instead of a hydrogen atom in the compound are bonded, and a position to be substituted is not limited as long as the position is one at which the hydrogen atom is substituted, that is, a position at which the substituent can be substituted, and when two or more are substituted, the two or more substituents may be the same as or different from each other.

More specifically, Chemical Formula 1 may include a compound represented by the following Chemical Formula 1-1.

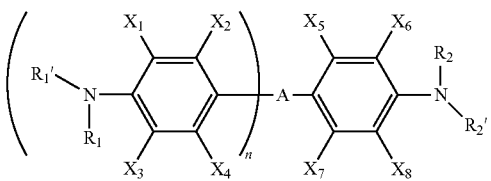

[Chemical Formula 1-1]

In Chemical Formula 1-1, the definitions of A, $X_1$ to $X_8$, $R_1$, $R_1'$, $R_2$, $R_2'$ and n include those described above in Chemical Formula 1.

Specific examples of Chemical Formula 1-1 may include: 4,4'-diaminodiphenyl sulfone (in Formula 1-1, A is a sulfone group, $X_1$ to $X_8$, $R_1$, $R_1'$, $R_2$, and $R_2'$ are each independently a hydrogen atom, and n is 1); bis(4-aminophenyl)methanone (in Formula 1-1, A is a carbonyl group, $X_1$, $X_2$, $R_1$, $R_1'$, $R_2$, and $R_2'$ are each independently a hydrogen atom, and n is 1); 4,4'-(perfluoropropane-2,2-diyl)dianiline (in Formula 1-1, A is perfluoropropane-2,2-diyl, $X_1$ to $X_8$, $R_1$, $R_1'$, $R_2$, and $R_2'$ are each independently a hydrogen atom, and n is 1); 4,4'-(2,2,2-trifluoroethane-1,1-diyl)dianiline (in Formula 1-1, A is 2,2,2-trifluoroethane-1,1-diyl, $X_1$ to $X_8$, $R_1$, $R_1'$, $R_2$, and $R_2'$ are each independently a hydrogen atom, and n is 1); and the like.

In addition, Chemical Formula 2 may include a compound represented by the following Chemical Formula 2-1.

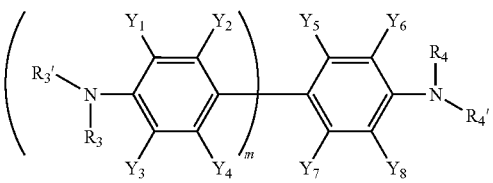

[Chemical Formula 2-1]

In Chemical Formula 2-1, the definitions of $Y_1$ to $Y_8$, $R_3$, $R_3'$, $R_4$, $R_4'$, and m include those described above in Chemical Formula 2.

Specific examples of Chemical Formula 2-1 may include: 2,2',3,3',5,5',6,6'-octafluorobiphenyl-4,4'-diamine (in Formula 2-1, $Y_1$ to $Y_8$ are halogen such as a fluoro group, $R_3$, $R_3'$, $R_4$, and $R_4'$ are each independently a hydrogen atom, and m is 1); 2,2'-bis(trifluoromethyl)biphenyl-4,4'-diamine (where $Y_2$ and $Y_7$ are each a trifluoromethyl group, $Y_1$, $Y_3$, $Y_4$, $Y_5$, $Y_6$, and $Y_8$ are a hydrogen atom, $R_3$, $R_3'$, $R_4$, and $R_4'$ are each independently a hydrogen atom, and m is 1); and the like.

Further, Chemical Formula 3 may include a compound represented by the following Chemical Formula 3-1.

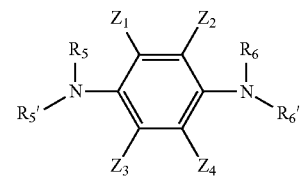

[Chemical Formula 3-1]

In Chemical Formula 3-1, the definitions of $Z_1$ to $Z_4$, $R_5$, $R_5'$, $R_6$, and $R_6'$ include those described above in Chemical Formula 3.

Specific examples of Chemical Formula 3-1 may include: 2,3,5,6-tetrafluorobenzene-1,4-diamine (in Formula 3-1, $Z_1$ to $Z_4$ are each a halogen such as a fluoro group, $R_5$, $R_5'$, $R_6$, and $R_6'$ are each independently a hydrogen atom); and the like.

The content of the amine compound may be 15 to 60% by weight, based on the total weight of the amine compound and the binder resin.

Preferably, the content of the amine compound may be 20 to 55% by weight, based on 100 parts by weight in total of the amine compound and the binder resin. When the content of the amine compound is excessively reduced to less than 15% by weight, insufficient curing occurs. When the content of the amine compound is excessively increased to more than 80 parts by weight, the curing rate can be increased and thus the fluidity of the thermosetting resin composition can be lowered. Further, the mechanical properties of the metal thin film using the thermosetting resin composition may be deteriorated by the unreacted amine compound.

In addition, the thermosetting resin composition for coating a metal thin film of one embodiment may include a binder resin.

The binder resin may include at least one resin selected from the group consisting of an epoxy resin and a bismaleimide resin.

In this case, as the epoxy resin, any of those used for a thermosetting resin composition can be used without limitation, and the kind thereof is not limited. Examples thereof may be a bisphenol A type of epoxy resin, a phenol novolac epoxy resin, a phenyl aralkyl type of epoxy resin, a tetraphenyl ethane epoxy resin, a naphthalene-based epoxy resin, a biphenyl-based epoxy resin, a dicyclopentadiene epoxy resin, and a mixture of a dicyclopentadiene-based epoxy resin and a naphthalene-based epoxy resin.

Specifically, the epoxy resin may be a bisphenol A type of epoxy resin represented by the following Chemical Formula 4, a novolac type of epoxy resin represented by the following Chemical Formula 5, a phenyl aralkyl type of epoxy resin represented by the following Chemical Formula 6, a tetraphenyl ethane type of epoxy resin represented by the following Chemical Formula 7, a naphthalene type of epoxy resin represented by the following Chemical Formulas 8 and 9, a biphenyl type of epoxy resin represented by the following Chemical Formula 10, and a dicyclopentadiene type of epoxy resin represented by the following Chemical Formula 11.

In Chemical Formula 4,

R is

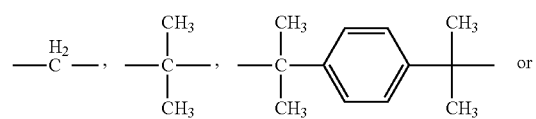

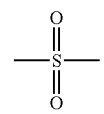

and n is an integer of 0 or 1 to 50.

More specifically, depending on the type of R, the epoxy resin of Chemical Formula 4 may be bisphenol A type of epoxy resin, bisphenol F type of epoxy resin, bisphenol M type of epoxy resin, or bisphenol S type of epoxy resin, respectively.

[Chemical Formula 5]

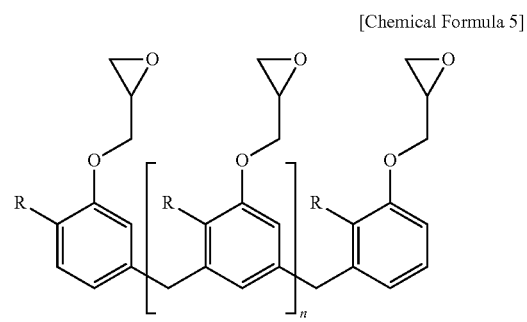

In Chemical Formula 5,

R is H or $CH_3$, and n is an integer of 0 or 1 to 50.

More specifically, depending on the type of R, the novolac type of epoxy resin of Chemical Formula 5 may be a phenol novolac type of epoxy resin or a cresol novolac type of epoxy resin, respectively.

[Chemical Formula 4]

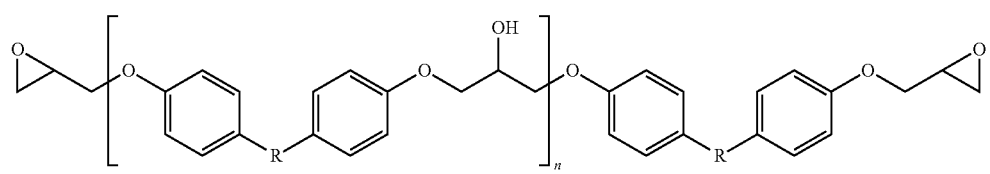

[Chemical Formula 6]

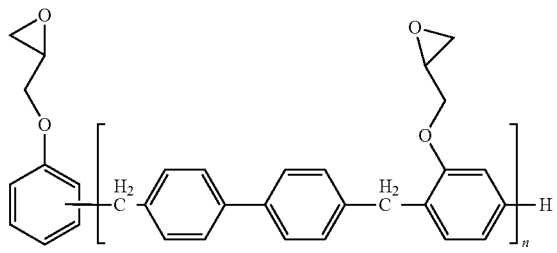

[Chemical Formula 7]

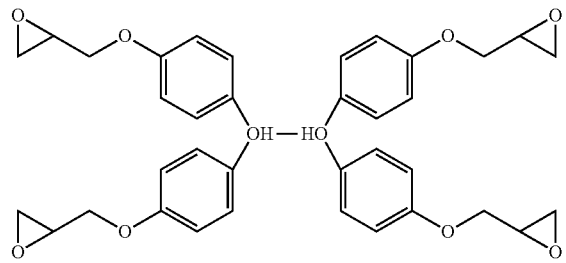

[Chemical Formula 8]

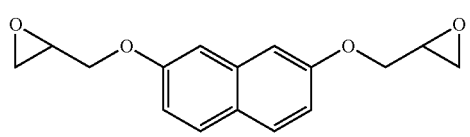

[Chemical Formula 9]

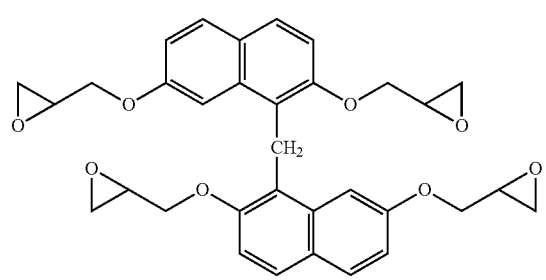

[Chemical Formula 10]

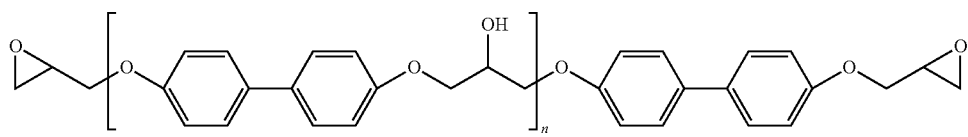

in Chemical Formula 10,
n is an integer of 0 or 1 to 50.

[Chemical Formula 11]

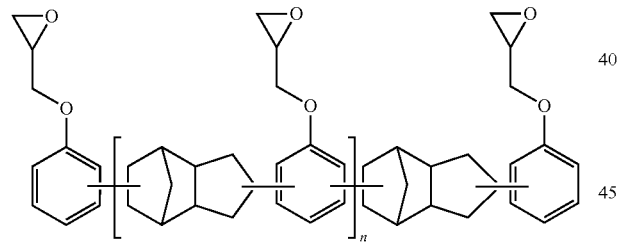

In Chemical Formula 11, n is an integer of 0 or 1 to 50.

Further, in the present invention, the content of the epoxy resin may be 30 to 80% by weight and the content of the bismaleimide resin may be 1 to 20% by weight, based on the total weight of the amine compound and the binder resin. Preferably, the content of the epoxy resin may be 35 to 70% by weight, based on 100 parts by weight in total of the amine compound and the binder resin. Further, the content of the bismaleimide resin may be 1 to 10% by weight, based on 100 parts by weight in total of the amine compound and the binder resin.

When the amount of the epoxy resin contained in the binder resin is less than 30% by weight, there is a problem that it is difficult to realize a high Tg, and when the amount of the epoxy resin exceeds 80% by weight, there is a problem that the flowability is deteriorated.

As the bismaleimide resin, any of those conventionally used in a thermosetting resin composition can be used without limitation, and the type thereof is not limited.

According to one embodiment, the bismaleimide resin is at least one selected from the group consisting of a diphenylmethane type of bismaleimide resin represented by the following Chemical Formula 12, a phenylene type of bismaleimide resin represented by the following Chemical Formula 13, a bisphenol A type of diphenyl ether bismaleimide resin represented by the following Chemical Formula 14, and a bismaleimide resin composed of an oligomer of a diphenylmethane type of bismaleimide and a phenylmethane type of maleimide represented by the following Chemical Formula 15.

[Chemical Formula 12]

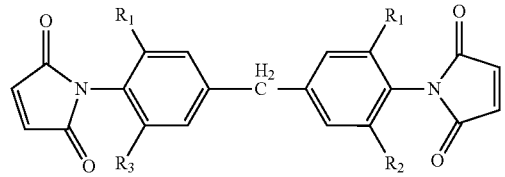

In Chemical Formula 12,
$R_1$ and $R_2$ are each independently H, $CH_3$, or $C_2H_5$.

[Chemical Formula 13]

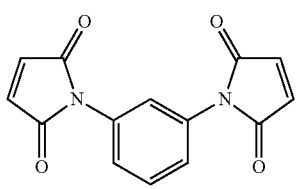

[Chemical Formula 14]

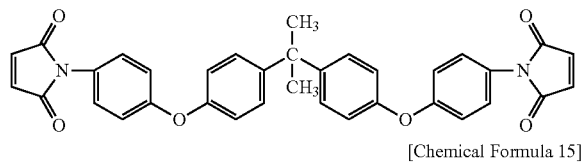

[Chemical Formula 15]

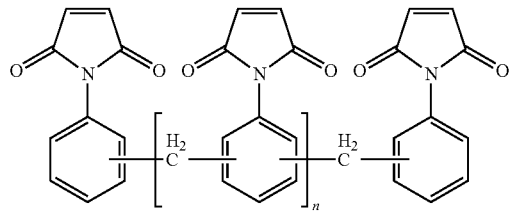

In Chemical Formula 15, n is an integer of 0 or 1 to 50.

When the amount of the bismaleimide resin contained in the binder resin is less than 1% by weight, there is a problem that desired physical properties cannot be achieved, and when the amount of the bismaleimide resin is more than 20% by weight, there are many unreacted groups which can adversely affect characteristics such as chemical resistance.

Meanwhile, the thermosetting resin composition of one embodiment may include a rubber-based component together with the binder component.

In the present invention, by including a specific rubber-based component at a certain ratio together with a binder containing an amine compound, the thermosetting composition for coating a metal thin film satisfies the condition of a complex viscosity of 3500 Pa·s or less in the range in which the rheometer lowest viscosity window is 90 to 180° C. The lower limit of the complex viscosity condition is not particularly limited, and may be, for example, 100 Pa·s or more.

Specifically, the compound that satisfies the complex viscosity condition may be at least one rubber-based component selected from the group consisting of a styrene butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber. More preferably, the rubber-based component may be at least one selected from the group consisting of a butadiene-based rubber, a silicone-based rubber, and an acrylic-based rubber.

In addition, the rubber-based component characterized by the present invention may contain 5 parts by weight or more and less than 40 parts by weight of at least one rubber-based component selected from the group consisting of a styrene butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber, based on 100 parts by weight of the binder resin.

Preferably, for an optimum ratio of the rubber-based component for improving the flowability and the pattern-filling property, the rubber-based component may contain 5 parts by weight to 20 parts by weight, based on 100 parts by weight in total of the amine compound and the binder resin.

When the content of the rubber-based component is less than 5 parts by weight, there is a problem that the flowability of the resin is too high and a deviation of thickness increases. When the content of the rubber-based component is 20 parts by weight or more, there is a problem that the flowability is very low and the pattern-filling property is lowered.

Among the rubber-based components, the butadiene-based rubber may include a copolymer including a butadiene repeating unit in which a terminal group is substituted with a hydroxy group, a butadiene repeating unit containing an acrylic-based group, or a butadiene repeating unit containing an epoxy group, and having a weight average molecular weight of $1 \times 10^3$ to $5 \times 10^4$.

Further, the silicone-based rubber may include a copolymer including an epoxy group or a polyether-modified silicone repeating unit, or a silicone repeating unit in which a terminal group is substituted with an amine group or an epoxy group, and having a weight average molecular weight of $1 \times 10^3$ to $5 \times 10^4$.

The acrylic-based rubber is contained in the resin composition and thus it can exhibit low curing shrinkage characteristics.

In addition, the acrylic-based rubber can further enhance the effect of an expansion relaxing function.

The acrylic-based rubbers used herein are those having a molecular structure in which the acrylic acid ester copolymer has rubber elasticity.

Specifically, the acrylic-based rubber may include an acrylic acid ester copolymer containing a repeating unit derived from butyl acrylate and a repeating unit derived from acrylonitrile, an acrylic acid ester copolymer containing repeating units derived from butadiene, or a repeating unit derived from an alkyl acrylate containing a linear or branched alkyl group having 2 to 10 carbon atoms.

On the other hand, the weight average molecular weight of the acrylic-based rubber is $30 \times 10^4$ to $65 \times 10^4$. If the weigh average molecular weight is out of the above range, the flowability may be insufficient or excessive.

Further, the type of the styrene butadiene-based rubber, neoprene-based rubber, nitrile-based rubber, butyl-based rubber, ethylene propylene-based rubber, and urethane-based rubber is not particularly limited, and materials that are well known in the art may be used.

Preferably, the rubber-based component may be at least one selected from the group consisting of a butadiene-based rubber, a silicone-based rubber, and an acrylic-based rubber.

In addition, the thermosetting resin composition of one embodiment may include an inorganic filler. The inorganic filler can be used without particular limitation as long as it is well known in the art to which the present invention belongs. For example, the inorganic filler may be at least one compound selected from the group consisting of silica, aluminum trihydroxide, magnesium hydroxide, molybdenum oxide, zinc molybdate, zinc borate, zinc stannate, alumina, clay, kaolin, talc, calcined kaolin, calcined talc, mica, short glass fiber, glass fine powder, and hollow glass.

On the other hand, the content of the inorganic filler may preferably be 200 parts by weight or more, 200 parts by weight to 500 parts by weight, or 250 parts by weight to 400 parts by weight, based on 100 parts by weight in total of the amine compound and the binder resin. If the content of the filler is less than about 200 parts by weight, there are problems that the coefficient of thermal expansion is increased, a twisting phenomenon become more serious during the reflow process, and the rigidity of the printed circuit board is reduced.

The average particle diameter of the inorganic filler is preferably 0.1 μm to 100 μm. The inorganic filler may be a substance of which the surface is treated with silane, if necessary. In the inorganic filler, it is desirable to increase the packing density by mixing small particles of a nanoscale and large particles of a microscale.

The inorganic filler may be dispersed in the binder resin. The inorganic filler being dispersed in the binder resin means a state in which the inorganic filler and the binder resin are not separated from each other and are mixed. That is, in the thermosetting resin composition for coating a metal thin film of the one embodiment, a separation phase such as an inorganic filler separation phase or a resin separation phase made of a resin is not formed, and the inorganic filler and the resin can be uniformly mixed to form a dispersed phase. Accordingly, even when the inorganic filler is filled with a high content, it is possible to achieve an appropriate level of flowability, high thermal stability, and mechanical properties when coated onto a metal foil.

On the other hand, the thermosetting resin composition according to one embodiment of the present invention may further include at least one additive selected from the group consisting of solvents, ultraviolet absorbers, antioxidants, photopolymerization initiators, fluorescence brighteners, photosensitizers, pigments, dyes, thickeners, lubricants, antifoaming agents, dispersants, leveling agents, and brighteners.

Specifically, the thermosetting resin composition for coating a metal thin film according to one embodiment can be used as a solution by adding a solvent, if necessary. The type of the solvent is not particularly limited as long as it exhibits good solubility for the resin component. For example, an alcohol type, an ether type, a ketone type, an amide type, an aromatic hydrocarbon type, an ester type, a nitrile type, and the like can be used, and these solvents may be used alone or in combination of two or more. The content of the solvent is not particularly limited as long as it can be suitably used for adjusting the viscosity during the production of the thermosetting resin composition for coating a metal thin film.

The present invention may further include various other polymer compounds such as other thermosetting resins, thermoplastic resins and oligomers and elastomers thereof, and other flame retardant compounds or additives, as long as it does not impair characteristics inherent to the thermosetting resin composition. These are not particularly limited as long as they are selected from those commonly used in the art. Examples of the additives include ultraviolet absorbers, antioxidants, photopolymerization initiators, fluorescence brighteners, photosensitizers, pigments, dyes, thickeners, lubricants, antifoaming agents, dispersants, leveling agents, brighteners, and the like, and these may be used by being mixed to meet the purpose.

The thermosetting resin composition for coating a metal thin film according to an embodiment of the present invention having such a configuration can satisfy the condition of a complex viscosity of 3500 Pa·s or less, or 2000 Pa·s or less, in the range in which the rheometer lowest viscosity window is 90 to 180° C.

That is, assuming that the complex viscosity suitable for filling the pattern is 3500 Pa·s or less, in the case of the resin composition proposed in the present invention, the temperature range satisfying the viscosity condition is 90 to 180° C., which is very wide.

Therefore, the flowability within the laminating process section is high so voids are not generated after the resin lamination, thereby exhibiting an excellent pattern-filling property.

As the thermosetting resin composition of the present invention has the flowability of the resin, a metal laminate can be made using a metal thin film or the flowability can be secured during a build-up process. Thus, the fine pattern can be easily filled and the crack resistance of the thin film can be improved.

That is, the thermosetting resin composition of the present invention exhibits the condition of the minimum complex viscosity of a specific value due to curing which can widen a window for maintaining the minimum viscosity. Thus, voids are not generated at the time of pattern filling, and the effect of improving the pattern-filling property can be provided. Further, by using the thermosetting resin composition of the present invention, it is possible to provide a metal laminate having reduced thickness and improved stability and storability through the step of coating it onto at least one surface of the metal thin film.

<Metal Laminate>

According to another embodiment of the present invention, a metal laminate including a resin coating layer in which the thermosetting resin composition is cured on at least one surface of the metal thin film can be provided, wherein the resin coating layer includes: a cured product between an amine compound containing at least one functional group selected from the group consisting of a sulfone group, a carbonyl group, a halogen group, an alkyl group having 1 to 20 carbon atoms, an aryl group having 6 to 20 carbon atoms, a heteroaryl group having 2 to 30 carbon atoms, and an alkylene group having 1 to 20 carbon atoms; a binder resin containing an epoxy resin and a bismaleimide resin; and at least one rubber-based component selected from the group consisting of a styrene-butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber; and a filler dispersed in the cured product.

According to still another embodiment of the present invention, a method for producing a metal laminate can be provided, including coating the aforementioned thermosetting resin composition onto at least one surface of the metal thin film.

In addition, according to still another embodiment of the present invention, a metal laminate in which one or more metal laminate layers are laminated can be provided.

Specifically, the present invention provides a metal thin film including a cured product of the aforementioned thermosetting resin composition.

As described above, according to the present invention, a metal laminate exhibiting excellent thermal and mechanical properties can be provided by a simple method in which a resin composition which is excellent in flowability and pattern-filling property of a resin is prepared in the form of a varnish and then directly coated onto a metal thin film.

According to the above process, the thermosetting resin including a filler may be formed as a cured product on at least one side of the metal thin film, and the filler may be uniformly dispersed in the cured product.

Thus, according to one embodiment of the present invention, a step of coating the thermosetting resin composition onto at least one surface of the metal thin film can be included.

In addition, the method for producing the metal laminate may further include a step of curing the thermosetting resin composition coated on at least one surface of the metal thin film. After the curing step of the thermosetting resin composition, a well-known drying step may be further carried out, if necessary.

The present invention allows the curing reaction of the resin to be intentionally retarded, thereby lengthening the window in which the minimum viscosity in the temperature range of the lamination process is maintained.

Preferably, in the step of curing the thermosetting resin composition, the curing can be carried out at a temperature of 180 to 250° C. for 1 to 4 hours.

In addition, the method of coating the thermosetting resin composition on the metal thin film is not particularly limited, and a coating method that is well known in the art can be used.

As an example, a method of putting the thermosetting resin composition of the present invention in a coater device and coating it on at least one surface of the metal thin film to a certain thickness can be used.

As the coater device, a comma coater, a blade coater, a lip coater, a road coater, a squeeze coater, a reverse coater, a transfer roll coater, a gravure coater, a spray coater, and the like, may be used.

Further, a carrier film may be used for evaluation of the flowability. For the carrier film, a plastic film such as a polyethylene terephthalate (PET) film, a polyester film, a polyimide film, a polyamideimide film, a polypropylene film, and a polystyrene film may be used.

On the other hand, the varnish used for the coating may be in a state in which a solvent is added to the thermosetting resin composition. The solvent for the resin varnish is not particularly limited as long as it is miscible with the resin component and has good solubility. Specific examples thereof include ketones such as acetone, methyl ethyl ketone, methyl isobutyl ketone, and cyclohexanone, aromatic hydrocarbons such as benzene, toluene, and xylene, amides such as dimethylformamide and dimethylacetamide, and aliphatic alcohols such as methyl cellosolve and butyl cellosolve.

The metal thin film may include: a copper foil; an aluminum foil; a three-layer structural composite foil which includes nickel, nickel-phosphorus, a nickel-tin alloy, a nickel-iron alloy, lead, or a lead-tin alloy as an intermediate layer, and having copper layers of different thicknesses on both sides thereof; or a two-layer structural composite foil in which aluminum and a copper foil are combined.

According to one preferred embodiment, for the metal thin film used in the present invention, a copper foil or an aluminum foil is used, and those having a thickness of about 2 to 200 μm can be used, but the thickness thereof is preferably about 2 to 35 μm. More preferably, a copper foil is used as the metal thin film. Further, according to the present invention, as a metal thin film, a three-layer structural composite foil including nickel, nickel-phosphorus, a nickel-tin alloy, a nickel-iron alloy, lead, a lead-tin alloy, or the like as an intermediate layer, and having a copper layer having a thickness of 0.5 to 15 μm and a copper layer having a thickness of 10 to 300 μm on both sides thereof, or a two-layer structural composite foil in which aluminum and a copper foil are combined.

According to the method described above, the present invention can satisfy the minimum complex viscosity condition in a wider temperature range as compared with the conventional one by including the resin coating layer in which the thermosetting resin composition is cured on at least one surface of the metal thin film. In particular, the present invention can provide a metal laminate having excellent flowability and pattern-filling property.

At this time, the thickness of the resin coating layer in the metal laminate may be 5 to 90 μm, and preferably 5 to 30 μm.

Even if such a cured product is formed thin on the metal thin film, it is possible to exhibit excellent thermal and mechanical properties with respect to the metal thin film.

Further, in the metal laminate of the present invention, the glass transition temperature (Tg) of the resin after curing is 220 to 240° C.

The dielectric constant (Dk/Df) of the metal thin film, which is measured by obtaining Dk and Df at 1 GHz by the SPDR method, is 3.4/0.007, which is excellent.

In addition, when the resin composition of the present invention is used, as a result of a tensile test of the resin after curing, the elongation is 1.5 to 2%, or 1.6%, which is excellent.

That is, as a result of performing a tensile test with a resin composition composed of a monomolecular type, it can be observed that the elongation is superior until breakage when comparing at the same thickness, and as a result, it is confirmed that the crack resistance is excellent.

Therefore, the present invention exhibits excellent crack resistance when comparing at the same thickness, as compared with the existing resin-coated copper foil made of a monomolecular type, and contributes to improvement in performance of the semiconductor element.

As described above, according to another embodiment, a metal foil clad laminate in which metal laminates are laminated into one or more layers may be provided.

In this case, the metal foil clad laminate may further include a metal thin film. For example, in the metal foil, the resin layer of the metal laminate can be in contact therewith.

Further, when providing the metal foil clad laminate, the metal thin film can be used for lamination after etching and pattern fabrication. For example, when the second layer is laminated on the first layer, which is a metal thin film, a method of patterning the metal thin film (mainly Cu) as a first layer through complete etching or partial etching, then bringing the resin coating layer of the metal plate laminate into contact with the metal thin film and laminating a second layer thereon, can be carried out.

Therefore, the metal foil clad laminate thus produced can be provided in the form of a metal laminate with one or more laminated layers. Preferably, the metal laminated plate may include two metal laminates that are laminated such that the resin layers formed on the metal laminates face each other.

Furthermore, the present invention can be used for producing a double-sided or multi-layer printed circuit boards after laminating into one or more layers by using the metal laminate. In the present invention, the metal foil laminated plate can be circuit processed to produce a double-sided or multi-layer printed circuit board. In the circuit processing, a method performed in a general manufacturing process of a double-sided or multi-layer printed circuit board can be applied.

As described above, according to the present invention, by using the above-mentioned thermosetting resin composition, it is possible to provide a metal thin film coated with a resin and applicable to any of printed circuit boards in various fields.

The thermosetting resin composition for coating a metal thin film of the present invention optimizes the type of the resins constituting the binder and the mixing ratio thereof and includes a certain amount of the amine-based curing agent and the rubber-based component, thereby controlling the curing reaction of the resin. Thus, it is possible to provide an effect of increasing the flowability in the laminating process temperature range and of exhibiting a superior pattern-filling property as compared with the prior art. In particular, according to the present invention, even if the thickness of the laminated material is small, since the rheometer lowest viscosity window is wider than the conventional one, the pattern-filling property can be improved and it is possible to improve the reliability and performance of the semiconductor element as well as reduce the thickness of the substrate. Therefore, the present invention can improve crack resistance as compared with the conventional metal thin film.

In addition, the present invention has the effect of providing a metal thin film having excellent thermal and mechanical properties of the resin layer after curing, and also having excellent dielectric characteristics. That is, when the thermosetting resin composition of the present invention is used, it is possible to provide a thin metal laminate by directly coating the resin composition on the metal foil by a simple method without using a method which forms the prepreg using glass fabric. Furthermore, the present invention can provide a metal laminate having a relatively high glass transition temperature of the resin after curing as well as excellent dielectric characteristics. The metal thin film may be laminated by one or more layers to provide a metal laminate used for reducing the thickness of electronic devices.

EXAMPLES

The invention will be described in more detail by way of the examples shown below. However, these examples are provided for the purpose of illustration only, and the scope of the present invention is not limited thereto.

Examples 1 to 6

Production of Copper Foil-Clad Laminate Coated with Resin Composition (1) Production of Thermosetting Resin Composition As shown in Table 1 below, an amine compound, an epoxy resin, and a bismaleimide resin were dissolved in a cyclohexanone solvent to prepare a varnish. In order to improve the mechanical strength, a silica inorganic filler was added to the varnish.

The varnish containing the above components was stirred for at least 24 hours to prepare a coating solution.

The viscosity control and degassing of the coating solution were carried out using a rotary evaporator.

(2) Production of Metal Thin Film Coated with Thermosetting Resin Composition (Resin-Coated Copper-Clad Laminate)

The coating solution was coated (coating thickness: 16 μm) on one surface of a copper foil (thickness: 2 μm, Mitsui) with a comma coater, and then cured at 220° C. and 35 kg/cm$^2$ for 100 minutes. Subsequently, the sample was cut to a size of 17×15 cm to produce a resin-coated copper foil-clad laminate sample.

Comparative Examples 1 to 3

Production of Copper Foil Coated with Resin Composition (1) Production of Thermosetting Resin Composition A varnish was prepared using the components shown in the following Table 2 and a cyclohexanone solvent. At this time, the case where the acrylic rubber A or the acrylic-based rubber B was not used, was set as Comparative Example 1, and the case where the content range was outside the range of the present invention was set as Comparative Examples 2 to 4.

The varnish containing the above components was stirred for at least 24 hours to prepare a coating solution.

The viscosity control and degassing of the coating solution were carried out using a rotary evaporator.

(2) Production of Metal Thin Film Coated with Thermosetting Resin Composition

The coating solution was coated (coating thickness: 16 μm) on a copper foil (thickness: 2 μm, Mitsui) with a comma coater and then cured at 220° C. and 35 kg/cm$^2$ for 100 minutes. Subsequently, the sample was cut to a size of 17×15 cm to produce a resin-coated copper foil-clad laminate sample.

Comparative Example 4

Production of a Laminated Plate including a Copper Foil Integrated with a Prepreg in which a Resin Composition is Impregnated in a Fabric Substrate.

(1) Production of Thermosetting Resin Composition

The resin was dissolved in an organic solvent at the ratio shown in Table 2 below to form a varnish, and then the mixture was stirred for 24 hours or more.

(2) Production of Prepreg and Copper-Clad Laminate

The stirred varnish was impregnated to a woven glass fabric (thickness: 12 μm, manufactured by Asahi Glass), and then dried with hot air at a temperature of 180° C. for 2 to 5 minutes to produce a 16 μm-thick prepreg.

Then, the copper foil was vertically laminated to produce a copper clad laminate. That is, a copper foil (thickness: 2 μm, manufactured by Mitsui) was placed on both surfaces of the prepreg produced above and laminated, and then cured at 220° C. and 35 kg/cm$^2$ for 100 minutes to produce a copper clad laminate.

TABLE 1

| | Example 1 | Example 2 | Example 3 | Example 4 | Example 5 | Example 6 |
|---|---|---|---|---|---|---|
| Amine compound (DDS) | 28 | 28 | 28 | 28 | 28 | 20 |
| Epoxy resin (wt %) | 68 | 68 | 68 | 68 | 68 | 68 |
| Bismaleimide resin (wt %) | 4 | 4 | 4 | 4 | 4 | 4 |
| Acrylic-based resin A (parts by weight) | 20 | | | | | 25 |
| Acrylic-based resin B (parts by weight) | | 20 | | | | |
| Silicone-based resin (parts by weight) | | | 20 | | | |
| Butadiene rubber A (part by weight) | | | | 20 | | |
| Butadiene rubber B (parts by weight) | | | | | 20 | |
| Filler A (parts by weight) | 250 | 250 | 250 | 250 | 250 | 250 |

TABLE 2

|  | Comparative Example 1 | Comparative Example 2 | Comparative Example 3 | Comparative Example 4 |
|---|---|---|---|---|
| Epoxy resin (wt %) | 46 | 28 | 28 | 28 |
| Cyanate ester resin (wt %) | 47 | 68 | 68 | 68 |
| Bismaleimide resin (wt %) | 7 | 4 | 4 | 4 |
| Acrylic-based resin A (parts by weight) |  | 40 |  | 10 |
| Acrylic-based rubber B (parts by weight) |  |  | 40 |  |
| Filler A (parts by weight) | 250 | 250 | 250 | 250 |

Note)
* DDS: 4,4'-diaminodiphenyl sulfone

Epoxy resin: naphthalene-based epoxy resin (HP4710, DIC Corporation)

Bismaleimide-triazine resin: BMI-2300, DAIWA Kasei

Cyanate ester resin: novolac type cyanate resin (PT-30S, Lonza Ltd.)

Acrylic-based rubber A: SG-P3-PT197 (Mw 65×10$^4$, Tg: 12° C.), Nagase Chemtex Corporation Acrylic-based rubber B: SG-P3-MW1 (Mw 30×10$^4$, Tg: 12° C.), Nagase Chemtex Corporation Silicone-based rubber: AY42-119, Dow Corning Butadiene rubber A: B-1000, Nippon Soda Butadiene rubber B: RICON181, Cray Valley Filler A: Phenyl aminosilane-treated slurry type of filler, average particle diameter: 0.5 μm (SC2050MTO, Admatechs)

Experimental Example

Physical properties of the copper clad laminates produced in examples and comparative examples were measured by the following methods.

1. Analysis of Viscosity and Flowability

In order to observe the viscosity and flowability of the resin layer depending on the temperature, the coating solutions of Example 1 and Comparative Example 1 were coated onto a PET substrate and laminated with a laminator to prepare a sample having an appropriate thickness, and the rheometer viscosity was measured (condition for viscosity measurement according to temperature, temperature rise rate: 5° C./min, frequency: 10 Hz).

In addition, the viscosity and flowability were confirmed through the presence or absence of void formation in the pattern laminating test. For the pattern lamination test, a copper-clad laminate (CCL) having a pattern in which a copper foil thickness of 10 μm and about 60% of the total area was etched was used, and the resin copper foil-coated samples (or prepregs) obtained in the examples or comparative examples were laminated thereon. When no void or delamination occurred, it is evaluated as 'OK', and when voids or delamination occurred, it was evaluated as 'NG'. As a result of observing the void formation, voids did not occur in Example 1, but voids did occur in Comparative Example 1.

FIG. 1 shows a rheometer curve for confirming the flowability and pattern-filling property of Examples 1 and 6 of the present invention and Comparative Example 1.

From the results of FIG. 1, assuming that the complex viscosity suitable for filling the pattern is 3500 Pa·s or less, it can be confirmed that Examples 1 and 6 of the present invention have the rheometer lowest viscosity window of 90° C. to 180° C. which is very wide and satisfy the complex viscosity range of 3500 Pa·s or less, and therefore, the flowability and the pattern-filling property are more advantageous, as compared with Comparative Example 1.

2. Resin Properties after Curing

In order to analyze the physical properties of the resin after curing, two sheets of the resin-coated copper foils of the examples shown above were laminated so that the resin layers faced each other, and curing was carried out for 100 minutes under the conditions of 220° C. and 35 k/cm$^2$ through a vacuum heat press. Further, in Comparative Example 4, a copper-clad laminate using the above-mentioned prepreg was used in the experiment.

At the time of the experiment, the copper foil was removed by etching, and the thermal (Tg), mechanical (modulus), and dielectric characteristics (Dk/Df) of the resin layers were measured by the following method. The results are shown in Tables 3 and 4 below. Thermal and mechanical properties were measured using analytical instruments such as DSC, TGA DMA, and TMA. The measurement of the dielectric characteristics was carried out by the SPDR method to obtain Dk and Df at 1 GHz.

(1) Glass Transition Temperature (Tg)

The glass transition temperature was measured using DMA.

(2) Modulus (GPa)

The modulus was measured using DMA.

(3) Dielectric Characteristic (Dk/Df)

Using an Agilent E5071B ENA instrument as the dielectric characteristic measuring device, the dielectric constant (Dk) and dielectric loss (Df) at 1 GHz were measured by the SPDR (split post dielectric resonance) method to calculate dielectric characteristics (Dk/Dg).

(4) Coefficient of Thermal Expansion (CTE)

The copper foil layers of the copper clad laminate obtained in the examples and comparative examples were removed by etching and then measured using TMA (50° C. to 150° C., X-Y direction).

(5) Elongation

Tensile tests were carried out through UTM.

Tensile strain at break, that is, elongation, was measured while applying a tensile stress. FIG. 2 is a graph showing a comparison of the elongation measurement results of Examples 1 and 6 and Comparative Example 1.

TABLE 3

|  | Example 1 | Example 2 | Example 3 | Example 4 | Example 5 | Example 6 |
|---|---|---|---|---|---|---|
| Tg (° C., DMA) | 220 | 220 | 220 | 210 | 210 | 220 |
| Modulus (GPa, 30/260° C.) | 9/0.2 | 9/0.2 | 8/0.2 | 9/0.3 | 9/0.2 | 8/0.2 |

TABLE 3-continued

|  | | Example 1 | Example 2 | Example 3 | Example 4 | Example 5 | Example 6 |
|---|---|---|---|---|---|---|---|
| Dk/Df | | 3.4/0.007 | 3.4/0.007 | 3.4/0.007 | 3.5/0.008 | 3.4/0.008 | 3.5/0.008 |
| CTE (ppm/° C.) | | 16 | 16 | 16 | 17 | 17 | 16 |
| Elongation (%) | | 1.6 | 1.6 | 1.5 | 1.5 | 1.6 | 1.9 |
| Lamination on Cu Pattern: Void or Delamination | Fresh | OK | OK | OK | OK | OK | OK |
| | RT, 3 months | OK | OK | OK | OK | OK | OK |
| | Refridge, 3 months | OK | OK | OK | OK | OK | OK |

TABLE 4

| | | Comparative Example 1 | Comparative Example 2 | Comparative Example 3 | Comparative Example 4 |
|---|---|---|---|---|---|
| Tg (° C., DMA) | | 280 | 210 | 210 | 220 |
| Modulus (GPa, 30/260° C.) | | 15/5 | 7/0.2 | 7/0.2 | 21/9 |
| Dk/Df | | 3.4/0.006 | 3.5/0.008 | 3.5/0.009 | 3.9/0.009 |
| CTE (ppm/° C.) | | 16 | 17 | 17 | 10 |
| Elongation (%) | | 0.5 | 1.4 | 1.5 | — |
| Lamination on Cu Pattern: Void or Delamination | Fresh | NG | NG | NG | NG |
| | RT, 3 months | NG | NG | NG | NG |
| | Refridge, 3 months | NG | NG | NG | NG |

Through the above examples and comparative examples, the glass transition temperature (Tg) of the examples of the present invention was measured as 220° C. and the coefficient of thermal expansion (CTE) was 16 ppm. In addition, it was confirmed through a rheometer that the examples of the present invention were excellent in the minimum viscosity window and flowability, as compared with the comparative examples.

From the results of the tensile test, it was also confirmed that the examples of the present invention had excellent elongation at break of 1.6% as compared with the comparative examples.

The invention claimed is:

1. A thermosetting resin composition for coating a metal film comprising:
    an amine compound containing at least one functional group selected from the group consisting of a sulfone group, a carbonyl group, a halogen group, an alkyl group having 1 to 20 carbon atoms, an aryl group having 6 to 20 carbon atoms, a heteroaryl group having 2 to 30 carbon atoms, and an alkylene group having 1 to 20 carbon atoms;
        wherein the amine compound may include at least one compound selected from the group consisting of the following Chemical Formulas 1 to 3:

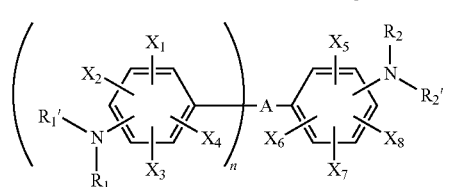

[Chemical Formula 1]

wherein, in Chemical Formula 1,

A is a sulfone group, a carbonyl group, or an alkylene group having 1 to 10 carbon atoms, $X_1$ to $X_8$ are ach independently a nitro group, a cyano group, a hydrogen atom, a halogen group, an alkyl group having 1 to 6 carbon atoms, an aryl group having 6 to 15 carbon atoms, or a heteroaryl group having 2 to 20 carbon atoms, $R_1$, $R_1'$, $R_2$ and $R_2'$ are each independently a hydrogen atom, a halogen group, an alkyl group having 1 to 6 carbon atoms, an aryl group having 6 to 15 carbon atoms, or a heteroaryl group having 2 to 20 carbon atoms, and n is an integer of 1 to 10, in which the alkylene group having 1 to 10 carbon atoms, the alkyl group having 1 to 6 carbon atoms, the aryl group having 6 to 15 carbon atoms, or the heteroaryl group having 2 to 20 carbon atoms are each independently substituted with a nitro group, a cyano group, or a halogen group,

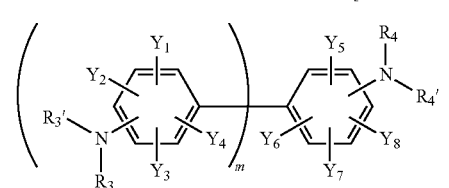

[Chemical Formula 2]

wherein, in Chemical Formula 2, $Y_1$ to $Y_8$ are each independently a nitro group, a cyano group, a hydrogen atom, a halogen group, an alkyl group having 1 to 6 carbon atoms, an aryl group having 6 to 15 carbon atoms, or a heteroaryl group having 2 to 20 carbon atoms, $R_3$, $R_3'$, $R_4$, and $R_4'$ are each independently a hydrogen atom, a halogen group, an alkyl group having 1 to 6 carbon atoms, an aryl group having 6 to 15 carbon atoms, or a heteroaryl group having 2 to 20 carbon atoms, and m is an integer of 1 to 10, in which the alkyl group having 1 to 6 carbon atoms, the aryl group having 6 to 15 carbon atoms, and the heteroaryl group having 2 to 20 carbon atoms are each independently substituted with at least one functional group selected from the group consisting of a nitro group, a cyano group, and a halogen group,

[Chemical Formula 3]

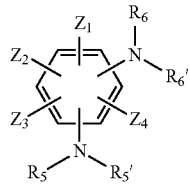

wherein, in Chemical Formula 3, $Z_1$ to $Z_4$ are each independently a nitro group, a cyano group, a hydrogen atom, a halogen group, an alkyl group having 1 to 6 carbon atoms, an aryl group having 6 to 15 carbon atoms, or a heteroaryl group having 2 to 20 carbon atoms, and $R_5$, $R_5'$, $R_6$, and $R_6'$ are each independently a hydrogen atom, a halogen group, an alkyl group having 1 to 6 carbon atoms, an aryl group having 6 to 15 carbon atoms, or a heteroaryl group having 2 to 20 carbon atoms, in which the alkyl group having 1 to 6 carbon atoms, the aryl group having 6 to 15 carbon atoms, and the heteroaryl group having 2 to 20 carbon atoms are each independently substituted with at least one functional group selected from the group consisting of a nitro group, a cyano group, and a halogen group;

a binder resin containing an epoxy resin and a bismaleimide resin;

an inorganic filler; and a rubber-based component, wherein the rubber-based component includes at least one rubber selected from the group consisting of a styrene-butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber, the rubber-based component is contained in an amount of 5 parts by weight or more and less than 40 parts by weight, based on 100 parts by weight in total of the amine compound and the binder resin, and when the viscosity of the thermosetting resin composition is measured in a temperature range of 90 to 180° C. using a rheometer, the lowest viscosity in the temperature range satisfies the condition of a complex viscosity of 3500 Pa·s or less.

2. The thermosetting resin composition for coating a metal film according to claim 1, wherein the rubber-based component is at least one rubber selected from the group consisting of a butadiene-based rubber, a silicone-based rubber, and an acrylic-based rubber.

3. The thermosetting resin composition for coating a metal film according to claim 1, wherein the rubber-based component is contained at 5 to 15 parts by weight based on 100 parts by weight in total of the amine compounds and binder resin.

4. The thermosetting resin composition for coating a metal film according to claim 1, wherein the acrylic-based rubber has a weight average molecular weight of $30 \times 10^4$ to $65 \times 10^4$, and comprises: (i) an acrylic acid ester copolymer containing a repeating unit derived from butyl acrylate and a repeating unit derived from acrylonitrile; (ii) an acrylic acid ester copolymer containing repeating units derived from butadiene; or (iii) a repeating unit derived from an alkyl acrylate containing a linear or branched alkyl group having 2 to 10 carbon atoms.

5. The thermosetting resin composition for coating a metal film according to claim 1, wherein the silicone-based rubber comprises: (i) a copolymer including an epoxy group or a polyether-modified silicone repeating unit, or (ii) a silicone repeating unit in which a terminal group is substituted with an amine group or an epoxy group, and wherein the silicone-based rubber has a weight average molecular weight of $1 \times 10^3$ to $5 \times 10^4$.

6. The thermosetting resin composition for coating a metal thin film according to claim 1, wherein the butadiene-based rubber comprises: (i) a copolymer including a butadiene repeating unit in which a terminal group is substituted with a hydroxy group, (ii) a butadiene repeating unit containing an acrylic group, or (iii) a butadiene repeating unit containing an epoxy group, and wherein the butadiene-based rubber has a weight average molecular weight of $1 \times 10^3$ to $5 \times 10^4$.

7. The thermosetting resin composition for coating a metal film according to claim 1,
wherein the content of the inorganic filler is 200 parts by weight or more, based on 100 parts by weight in total of the amine compound and the binder resin.

8. The thermosetting resin composition for coating a metal film according to claim 1,
wherein the content of the amine compound is 15 to 60% by weight, based on the total weight of the amine compound and the binder resin.

9. The thermosetting resin composition for coating a metal film according to claim 1,
wherein the content of the epoxy resin is 30 to 80% by weight and the content of the bismaleimide resin is 1 to 20% by weight, based on the total weight of the amine compound and the binder resin.

10. The thermosetting resin composition for coating a metal film according to claim 1,
wherein the inorganic filler is at least one compound selected from the group consisting of silica, aluminum trihydroxide, magnesium hydroxide, molybdenum oxide, zinc molybdate, zinc borate, zinc stannate, alumina, clay, kaolin, talc, calcined kaolin, calcined talc, mica, short glass fiber, glass fine powder, and hollow glass.

11. The thermosetting resin composition for coating a metal film according to claim 1,
further comprising at least one additive selected from the group consisting of solvents, ultraviolet absorbers, antioxidants, photopolymerization initiators, fluorescence brighteners, photosensitizers, pigments, dyes, thickeners, lubricants, antifoaming agents, dispersants, leveling agents, and brighteners.

12. A metal laminate comprising a resin coating layer wherein the resin coating layer comprises:
a cured product of the thermosetting resin composition of claim 1; and
a filler dispersed in the cured product.

13. The metal laminate according to claim 12, wherein the thickness of the resin coating layer is 5 to 30 μm and the glass transition temperature (Tg) is 210 to 230° C.

14. A method for producing a metal laminate, comprising coating the thermosetting resin composition of claim 1 onto at least one surface of the metal film.

15. A metal foil clad laminate in which the metal laminates of claim 12 are laminated into one or more layers.

* * * * *